US012504755B2

(12) United States Patent
Kobayashi et al.

(10) Patent No.: US 12,504,755 B2
(45) Date of Patent: Dec. 23, 2025

(54) SYSTEM, METHOD, AND STORAGE MEDIUM FOR SELECTIVELY PROVIDING REMOTE MONITORING AND REMOTE DRIVING TO A MOBILE OBJECT

(71) Applicant: TOYOTA JIDOSHA KABUSHIKI KAISHA, Toyota (JP)

(72) Inventors: Naofumi Kobayashi, Gotemba (JP); Hirofumi Momose, Numazu (JP); Rio Suda, Toyota (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 18/124,210

(22) Filed: Mar. 21, 2023

(65) Prior Publication Data

US 2023/0376029 A1 Nov. 23, 2023

(30) Foreign Application Priority Data

May 17, 2022 (JP) ................................. 2022-080890

(51) Int. Cl.
*G05D 1/00* (2006.01)
(52) U.S. Cl.
CPC ......... *G05D 1/0027* (2013.01); *G05D 1/0022* (2013.01)

(58) Field of Classification Search
CPC ............... G05D 1/0027; G05D 1/0022; G05B 19/0428; G05B 2219/24024
USPC .......................................................... 701/2
See application file for complete search history.

(56) References Cited

U.S. PATENT DOCUMENTS

| | | | |
|---|---|---|---|
| 2017/0221378 A1* | 8/2017 | Renganathan | G09B 19/167 |
| 2018/0063261 A1* | 3/2018 | Moghe | G07C 5/008 |
| 2019/0011910 A1* | 1/2019 | Lockwood | G05D 1/0038 |
| 2019/0339692 A1* | 11/2019 | Sakai | G05D 1/0027 |
| 2021/0173394 A1* | 6/2021 | Agarwal | G06T 7/85 |
| 2022/0110018 A1* | 4/2022 | Jha | H04W 74/0816 |
| 2023/0300226 A1* | 9/2023 | Hoshino | H04W 4/44 709/224 |

FOREIGN PATENT DOCUMENTS

JP 2018-142265 A 9/2018

* cited by examiner

*Primary Examiner* — Muhammad Shafi
(74) *Attorney, Agent, or Firm* — Sughrue Mion, PLLC

(57) ABSTRACT

Remote monitoring and remote driving are selectively provided for a plurality of vehicles including a first vehicle. In remote monitoring for a plurality of vehicles, a server distributes monitoring information received from each of a plurality of vehicles to a plurality of remote cockpits including a remote cockpit. In remote driving for the first vehicle, the server establishes a one-to-one communication between the vehicle and the remote cockpit.

10 Claims, 6 Drawing Sheets

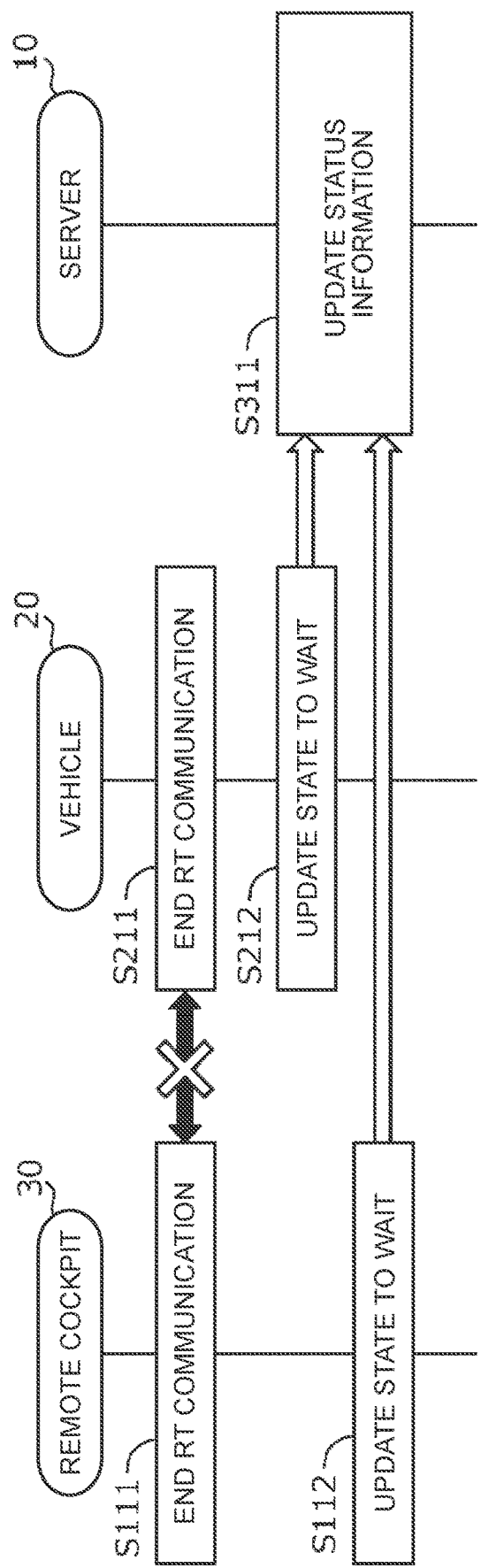

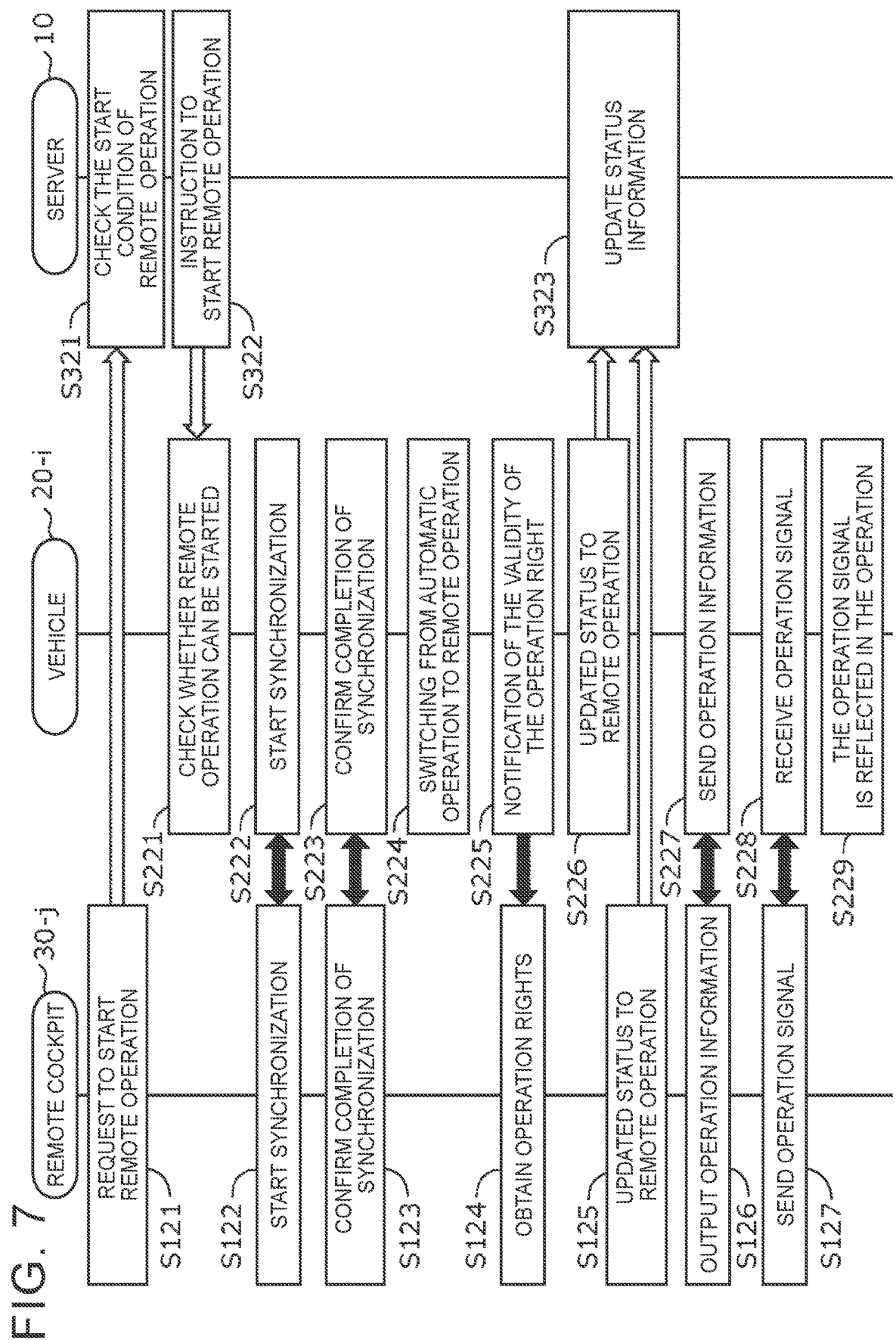

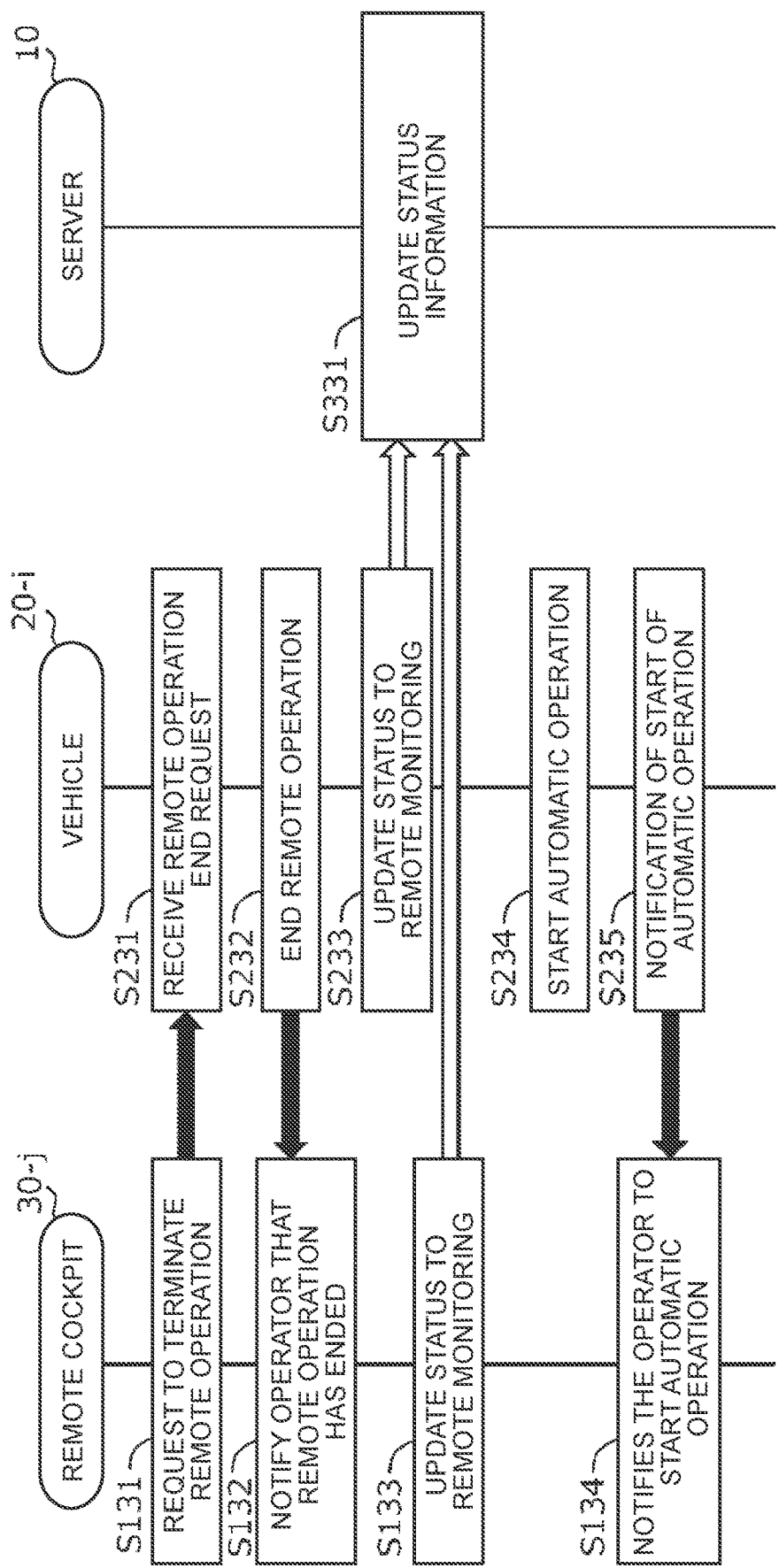

SYSTEM, METHOD, AND STORAGE MEDIUM FOR SELECTIVELY PROVIDING REMOTE MONITORING AND REMOTE DRIVING TO A MOBILE OBJECT

CROSS-REFERENCE TO RELATED APPLICATION

This application claims priority to Japanese Patent Application No. 2022-080890 filed on May 17, 2022, incorporated herein by reference in its entirety.

BACKGROUND

1. Technical Field

The present disclosure relates to a system, a method, and a storage medium for selectively providing remote monitoring and remote driving to a mobile object such as an autonomous driving vehicle.

2. Description of Related Art

Japanese Unexamined Patent Application Publication No. 2018-142265 (JP 2018-142265 A) discloses a related art related to an operation management device for managing a plurality of autonomous driving vehicles and remote drivers. The operation management device according to the related art receives information indicating the status of the autonomous driving vehicles from a plurality of autonomous driving vehicles via a network. When a need arises to switch from autonomous driving to remote operation in a certain autonomous driving vehicle, the operation management device assigns any one of the standby remote drivers to that autonomous driving vehicle.

SUMMARY

The remote driving performed in the above-described related art is one type of remote technology for a vehicle. The remote technology includes, in addition to the remote driving, remote monitoring for monitoring the vehicle by video, audio, sensor information, and the like transmitted from the vehicle. In the remote driving, one remote driver is in charge of one vehicle, whereas in the remote monitoring, one monitor can be in charge of a plurality of vehicles.

The remote driver who performs the remote driving and the remote monitor who performs the remote monitoring may be the same person. That is, one remote driver (or one monitor) can selectively execute the remote driving and the remote monitoring. However, there is a difference in technical requirements between the remote driving and the remote monitoring. In the remote driving in which the vehicle is driven from a remote location, a delay in communication between the remote cockpit operated by the remote driver and the vehicle is required to be low. On the other hand, in the remote monitoring in which the vehicles are simply monitored, the delay of communication is not a major problem. Bandwidth congestion caused by monitoring a single vehicle with a large number of monitors is more problematic.

The present disclosure has been made in view of the above-described issues. An object of the present disclosure is to provide a technique that enables remote monitoring by efficient use of a band and remote driving with low delay.

The present disclosure provides a system for achieving the above object. A system of the present disclosure includes: one or more processors; and a program memory storing a plurality of instructions that is executable. The instructions are configured to cause the one or more processors to selectively execute remote monitoring and remote driving. The remote monitoring is monitoring for receiving monitoring information from each of a plurality of mobile objects including a first mobile object and distributing the monitoring information to a plurality of remote cockpits including a first remote cockpit, and the remote driving is driving for establishing one-to-one communication between the first mobile object and the first remote cockpit. As described above, according to the system in which the communication modes are different between the remote monitoring and the remote driving, it is possible to achieve both the remote monitoring by use of an efficient band and the remote driving with a low delay.

In one embodiment of the system of the present disclosure, at least a part of the one or more processors may be provided in a server connected to the mobile objects via a mobile object communication network. The monitoring information received from each of the mobile objects may be distributed to the remote cockpits by the server in the remote monitoring. Peer-to-peer communication may be performed between the first mobile object and the first remote cockpit without using the server in the remote driving.

In another embodiment of the system of the present disclosure, at least a part of the one or more processors may be provided in a server connected to the mobile objects via a mobile object communication network. The mobile objects and the server may be connected by a plurality of bundled lines. The monitoring information received from each of the mobile objects may be distributed to the remote cockpits by the server in the remote monitoring. The one-to-one communication may be performed between the first mobile object and the first remote cockpit via the server in the remote driving.

In each of the above embodiments of the system of the present disclosure, the server may be configured to acquire information about a status of each of the mobile objects including the first mobile object and a status of each of the remote cockpits including the first remote cockpit each time a predetermined event occurs.

The present disclosure provides a method for achieving the above object. A method of the present disclosure includes: selectively providing remote monitoring and remote driving to a plurality of mobile objects including a first mobile object; distributing monitoring information received from each of the mobile objects to a plurality of remote cockpits including a first remote cockpit in the remote monitoring; and establishing one-to-one communication between the first mobile object and the first remote cockpit in the remote driving. As described above, by making the communication modes different between the remote monitoring and the remote driving, it is possible to achieve both the remote monitoring by use of an efficient band and the remote driving with low delay.

The present disclosure provides a storage medium storing a program for achieving the above object. The program is configured to cause a computer to execute processes including: selectively providing remote monitoring and remote driving to a plurality of mobile objects including a first mobile object; distributing monitoring information received from each of the mobile objects to a plurality of remote cockpits including a first remote cockpit in the remote monitoring; and establishing one-to-one communication between the first mobile object and the first remote cockpit in the remote driving. As described above, by causing the computer to execute the communication in which the modes are different between the remote monitoring and the remote driving, it is possible to achieve both the remote monitoring by use of an efficient band and the remote driving with low delay.

According to the technique of the present disclosure, as described above, by making the communication modes different between the remote monitoring and the remote driving, it is possible to achieve both the remote monitoring by use of an efficient band and the remote driving with low delay.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a sequence diagram illustrating an end procedure of remote monitoring common to the respective embodiments;

FIG. 7 is a sequence diagram illustrating a start procedure of remote driving common to the respective embodiments; and FIG. 8 is a sequence diagram illustrating an end procedure of remote driving common to the respective embodiments.

DETAILED DESCRIPTION OF EMBODIMENTS

Figure 1:
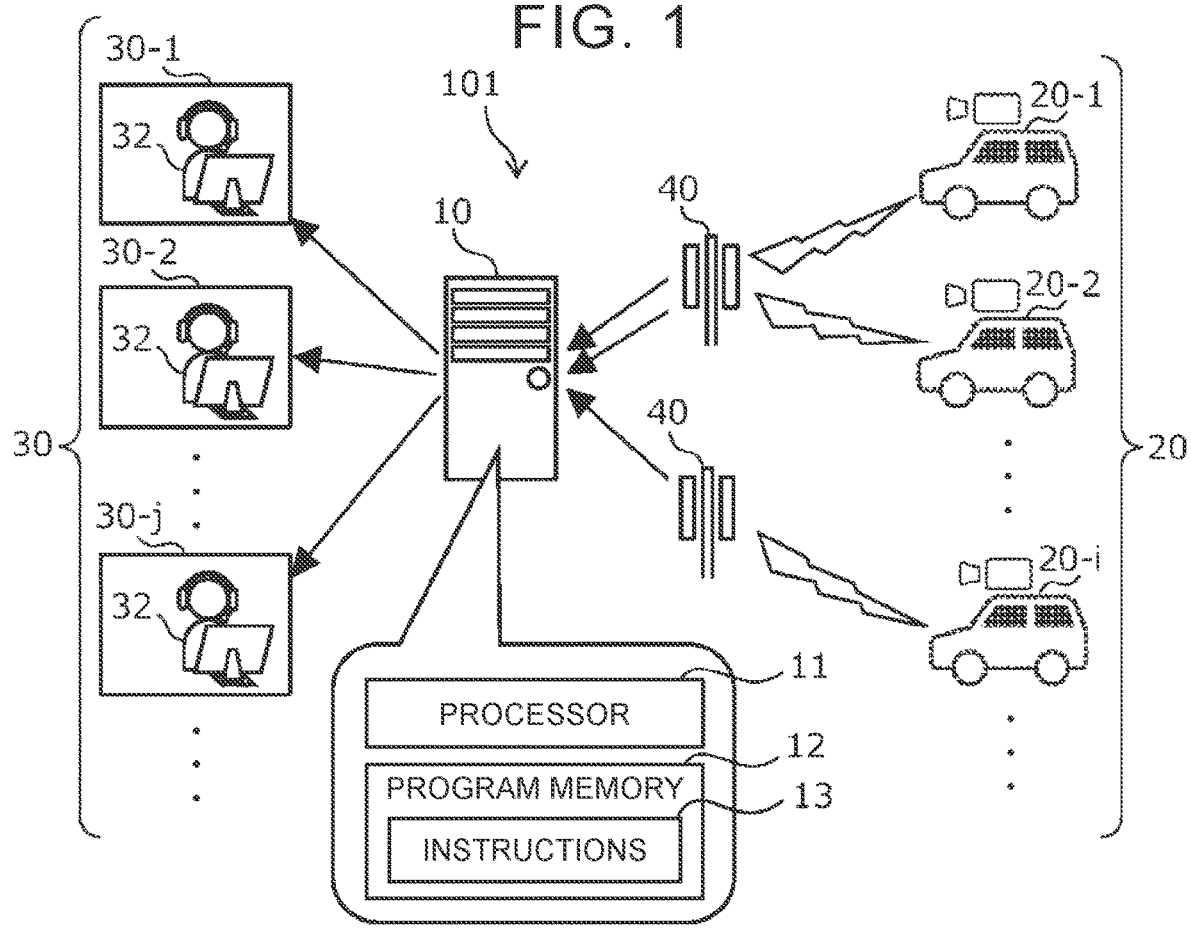
FIG. 1 is a diagram schematically illustrating a method of remote monitoring by a system according to a first embodiment of the present disclosure.

Hereinafter, embodiments of the present disclosure will be described with reference to the drawings. However, in the embodiments described below, when the number, the quantity, the quantity, the range, and the like of each element are referred to, the idea of the present disclosure is not limited to the number referred to. It is excluded in particular when it is explicitly stated or, in principle, when it is clearly specified in the number. Further, the structures and the like described in the embodiments described below are not necessarily essential to the idea of the present disclosure except for the case where they are particularly explicitly described or are clearly specified in principle.

1. Overview

A system according to each of the embodiments described below is a system that selectively provides remote monitoring and remote driving to an autonomous vehicle that is a moving object. The autonomous driving vehicle is, for example, a vehicle having an autonomous driving function of level 4 or higher. In each embodiment, an autonomous driving kit that provides an autonomous driving function to the vehicle is mounted on the autonomous driving vehicle that is an object of remote monitoring and remote driving. Further, in each of the embodiments, a remote driving kit that provides a remote monitoring function and a remote driving function is mounted on an autonomous driving vehicle that is an object of remote monitoring and remote driving. Each of the autonomous driving kit and the remote driving kit may be an independent computer. The autonomous driving kit and the remote driving kit may be independent applications running on a common computer. The type of the autonomous vehicle is not limited as long as it is a vehicle in which the necessity of remote monitoring and remote driving may occur during traveling by autonomous driving. Hereinafter, an autonomous vehicle that is an object of remote monitoring and remote driving is simply referred to as a vehicle.

When remote monitoring is performed and when remote driving is performed, the vehicle is connected to a remote cockpit. The remote cockpit is a terminal operated by a remote operator. The remote cockpit includes an operation system that simulates a driver's seat of an actual vehicle, and an information output system that outputs sensory information and vehicle information obtained by the driver at the driver's seat.

In the remote monitoring, the remote operator monitors the vehicle traveling in automatic driving by using the information obtained by the in-vehicle sensor. For example, the remote operator watches the image of the in-vehicle camera projected on the monitor to monitor for any abnormality, trouble, or danger. The remote operator may alert the driver or contact the police or fire department as necessary.

In remote monitoring, it is not necessary to exclusively assign one remote operator to one vehicle. Given that a single remote operator can monitor multiple vehicles and that monitoring a single vehicle leads to an early response to an anomaly, it may be more preferable to monitor multiple vehicles with multiple remote operators. Moreover, by reducing the number of remote operators compared to the number of vehicles to be monitored, personnel costs for remote monitoring can be reduced.

In remote driving, a remote operator operates a steering, a pedal, a shift lever, a winker, and the like of a vehicle from a remote cockpit. This allows the remote operator to drive the vehicle by himself. Unlike remote monitoring, in remote driving, it is necessary to exclusively assign one remote operator to one vehicle. Unless there is a special circumstance, the remote operator is responsible for driving the vehicle by himself/herself from the start to the end of the remote driving.

As a communication method for connecting the vehicle and the remote cockpit, for example, a server-client method in which all pieces of information are aggregated and processed in a server is exemplified. Further, as a communication method for connecting the vehicle and the remote cockpit, there is a peer-to-peer method in which direct communication is performed between the vehicle and the remote cockpit. The server-client method has an advantage in that the bandwidth is efficient. Peer-to-peer schemes have the advantage of low latency.

As described above, in the remote monitoring, it is desired to monitor a plurality of vehicles by a plurality of remote operators. Therefore, when a peer-to-peer method is adopted for remote monitoring, it is necessary to establish one-to-one communication for each combination for all combinations of the vehicle and the remote operator. As a result, the bandwidth of the line is consumed as many times as the number of communication partners of each vehicle, and thus the communication quality needs to be lowered. That is, peer-to-peer communication is not suitable for remote monitoring.

On the other hand, in the case of the server-client system, the communication partner viewed from the vehicle is only the server regardless of the number of remote cockpits. The server can broadcast information received from the vehicle to each remote cockpit simultaneously. Therefore, in the server-client system, each vehicle can use the maximum bandwidth. However, in the server, information such as video and audio is copied and buffered for broadcast. In the server-client method, communication delays are larger than in the peer-to-peer method by the time of the processing. However, in remote monitoring without vehicle operation, a certain amount of communication delay is allowed. Therefore, the server-client method is a communication method suitable for remote monitoring.

On the other hand, in the remote driving, one vehicle is driven by one remote operator. Therefore, the communication destination of the vehicle is one remote cockpit. Therefore, the possibility that the bandwidth of the line becomes a problem is low. Rather, in the remote driving in which the vehicle is operated, it is important that the delay until the operation performed in the remote cockpit is reflected in the vehicle is small. That is, real-time performance is emphasized. However, in the case of the server-client system, the real-time property is impaired by the amount of time required for processing such as copying and buffering due to broadcast distribution. That is, server-client communication with broadcast is not suitable for remote driving.

A communication method suitable for remote driving is a low-delay communication method. Specifically, a communication scheme suitable for remote driving is one-to-one communication established between a vehicle and a remote cockpit. A first example of such communication is peer-to-peer communication. In the case of a peer-to-peer system that does not use a server, low-latency communication is realized. In the first embodiment to be described later, the first example will be described more specifically.

A second example of a communication method suitable for remote driving is a method of generating an independent communication path separated from broadcast communication for remote monitoring in a server-client method. That is, a second example of a communication method suitable for remote driving is a communication method in which a target vehicle of remote driving and a remote cockpit are connected to each other on a one-to-one basis via a server. However, when compared to the peer-to-peer method, a slight delay due to passing through the server may occur in the second example of a communication method suitable for remote driving. Therefore, when this method is used, it is preferable to combine line binding in which a plurality of lines are bundled and used. The communication state of the mobile communication used by the vehicle depends on the communication environment and the congestion state. However, the effect is reduced by performing the line bound. In the second embodiment to be described later, the second example will be described more specifically.

2. First Embodiment

Figure 2:
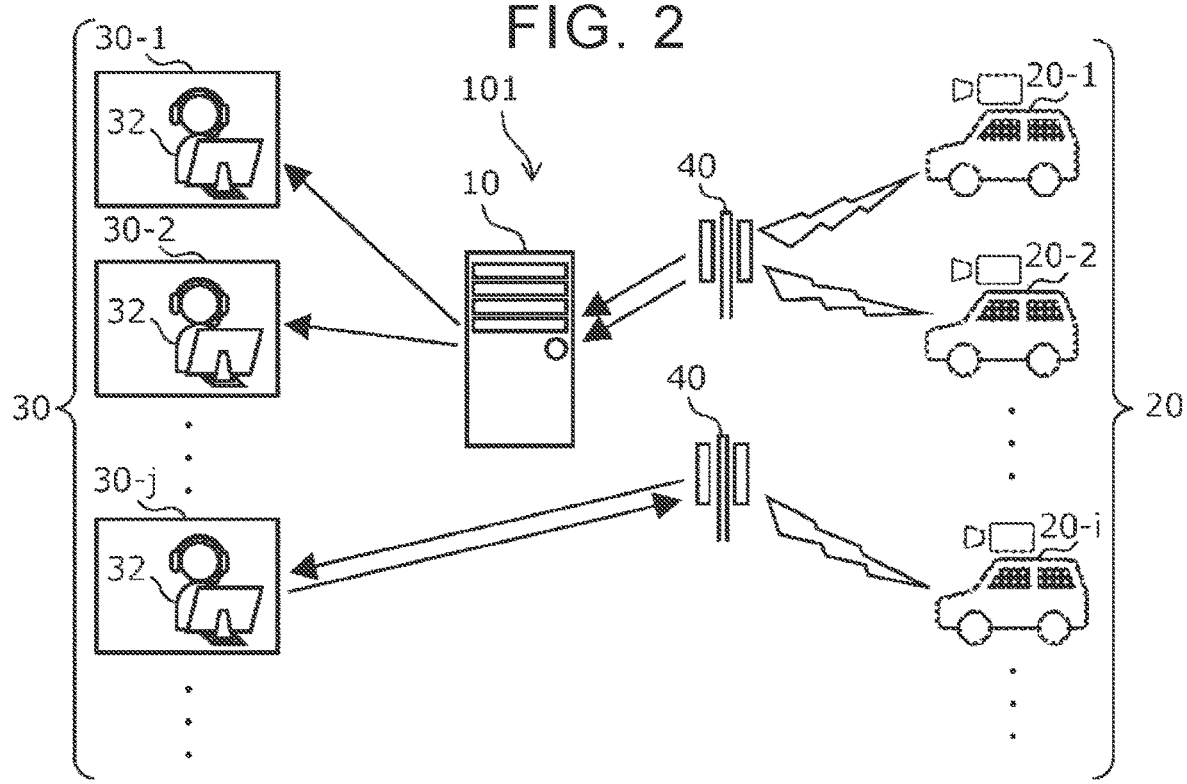
FIG. 2 is a diagram schematically illustrating a method of remote driving by the system according to the first embodiment of the present disclosure.

The system according to the first embodiment will be described with reference to FIGS. 1 and 2. FIG. 1 schematically shows a method of remote monitoring by a system 101 according to the present embodiment. FIG. 2 schematically shows a method of remote driving by the system 101 according to the present embodiment.

As illustrated in FIG. 1, the system 101 according to the present embodiment includes a server 10, a plurality of vehicles 20, and a plurality of remote cockpits 30 operated by a remote operator 32. The server 10 is provided on the Internet. The server 10 is connected to a plurality of radio base stations 40 via the Internet and a mobile communication network. The vehicles 20 perform mobile communication such as 5G and LTE with the radio base stations 40. The remote driving kit mounted on the vehicle 20 is provided with a communication unit for mobile communication. The remote cockpit 30 is connected to the servers 10 by a network including the Internet, LAN and WAN.

The server 10 includes a processor 11 and a program memory 12. The processor 11 is coupled to a program memory 12. The program memory 12 is a non-transitory storage medium that stores a plurality of executable instructions 13. The plurality of instructions 13 includes instructions for implementing remote monitoring of the vehicle 20 from the remote cockpit 30. In addition, the plurality of instructions 13 includes instructions for realizing remote driving of the vehicle 20 from the remote cockpit 30. The server is an example of a storage medium storing a program.

In remote monitoring, as shown in FIG. 1, a plurality of vehicles 20 are connected to a plurality of remote cockpits 30 via a server 10. In the following description, when distinguishing each of the vehicles 20, identifiers for identifying the respective vehicles are used, for example, the vehicles 20-1, 20-2, . . . , 20-i, . . . . Similarly, to distinguish between the individual remote cockpits 30, identifiers that identify the respective remote cockpits are used, such as, for example, the remote cockpits 30-1, 30-2, . . . , 30-j . . . .

In the remote monitoring, the server 10 communicates with each of the plurality of vehicles 20. Then, the server 10 receives monitoring information from each of the plurality of vehicles 20. The monitoring information includes video captured by the in-vehicle camera, sound collected by the in-vehicle microphone, and information on the state of the vehicle acquired by the instrument or the in-vehicle sensor. The server 10 broadcasts the monitoring information received from the plurality of vehicles 20 to the plurality of remote cockpits 30. For example, the monitoring data received from the vehicle 20-i is broadcast to the remote cockpits 30-1, 30-2, . . . , 30-j, . . . . Thus, remote monitoring of the vehicle 20-i by the plurality of remote operators 32 is realized. Details of the remote monitoring start procedure will be described later together with the end procedure.

Here, it is assumed that, among the plurality of vehicles 20 that are remotely monitored, the driving of the vehicle 20-i (corresponding to the first mobile object) is switched from the automated driving with remote monitoring to the remote driving from the remote cockpit 30-j (corresponding to the first remote cockpit). Here, as shown in FIG. 2, the communication between the vehicle 20-i and the remote cockpit 30-j is switched to a peer-to-peer method without passing through the servers 10. Details of the remote driving start procedure will be described later together with the end procedure.

For a vehicle 20 other than the vehicle 20-i, for example, the vehicle 20-1 and the vehicle 20-2, remote monitoring is performed by a server-client method. The monitoring data received by the servers 10 from the vehicles 20-1 and 20-2 are broadcasted to a remote cockpit 30 other than the remote cockpit 30-j, for example, the remote cockpit 30-1 or the remote cockpit 30-2.

3. Second Embodiment

Figure 3:
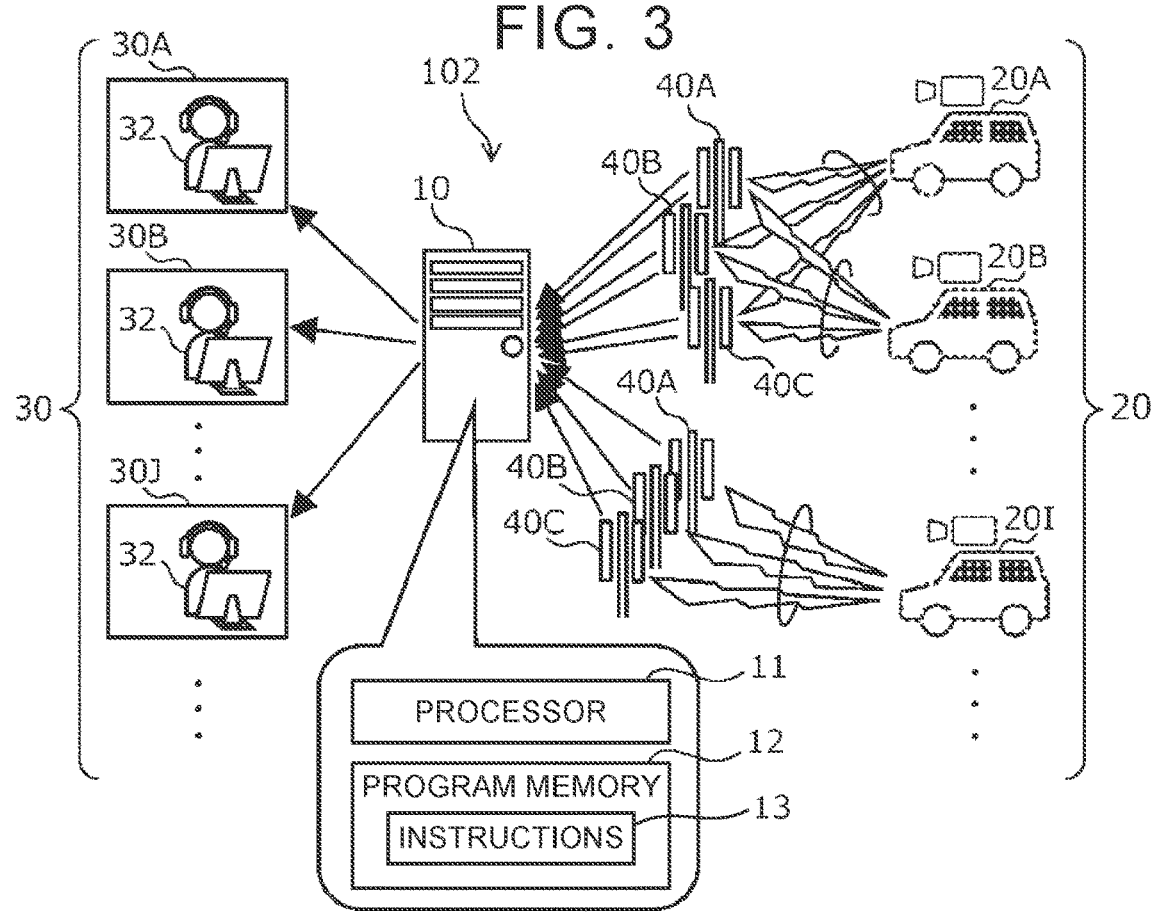
FIG. 3 is a diagram schematically illustrating a method of remote monitoring by a system according to a second embodiment of the present disclosure.
Figure 4:
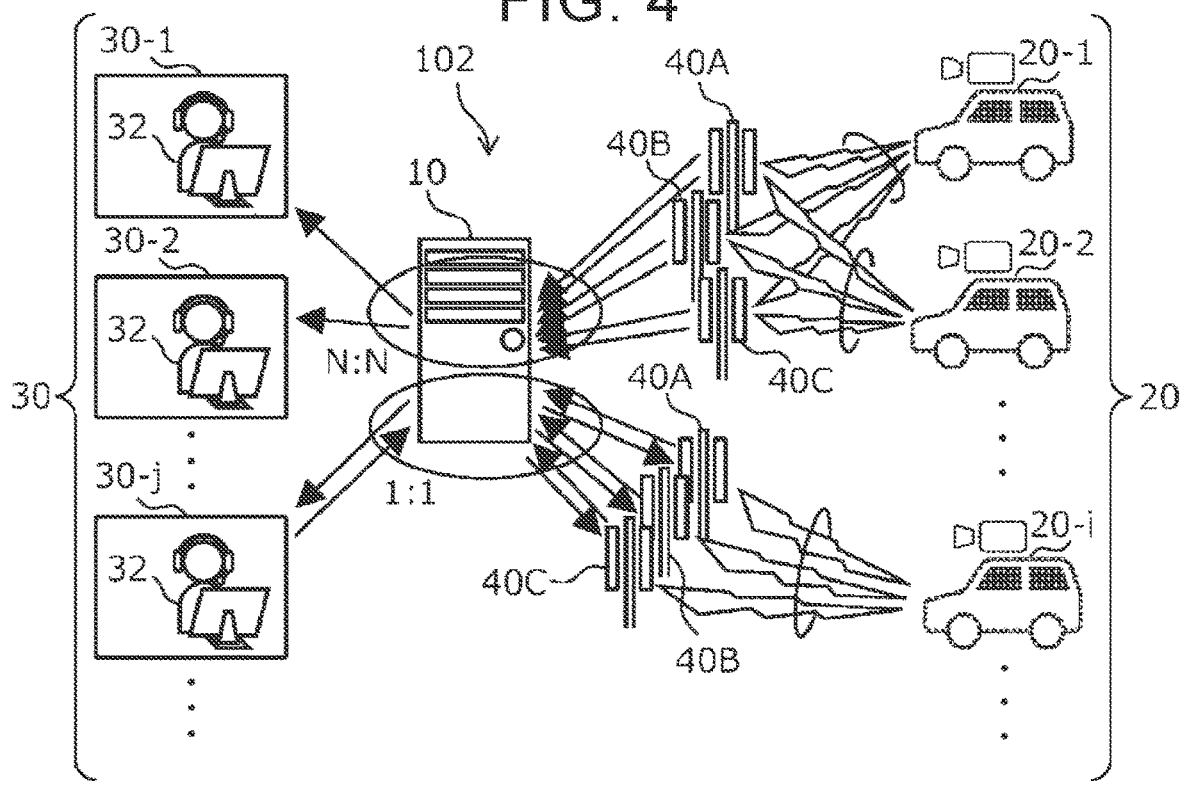
FIG. 4 is a diagram schematically illustrating a method of remote driving by the system according to the second embodiment of the present disclosure.

A system according to a second embodiment will be described with reference to FIGS. 3 and 4. FIG. 3 schematically illustrates a method of remote monitoring by the system 102 according to the present embodiment. FIG. 4 schematically shows a method of remote driving by the system 102 according to the present embodiment. In FIG. 3 and FIG. 4, among the elements of the system 102 according to the present embodiment, elements common to the system 101 according to the first embodiment are denoted by common reference numerals.

As illustrated in FIG. 3, in the system 102 according to the present embodiment, the server 10 is provided on the Internet. The servers 10 are connected to a plurality of radio base stations 40A, 40B, 40C corresponding to different lines. For example, the radio base station 40A corresponds to a line of the communication firm A. The radio base station 40B corresponds to a line of the communication firm B. The radio base station 40C corresponds to a line of the communication firm C. The vehicles 20 bundle and use a plurality of lines provided via the radio base station 40A, 40B, 40C. Therefore, a plurality of communication units corresponding to a plurality of lines to be used is mounted in the remote driving kit of the vehicle 20. The remote cockpit 30 and the server 10 are connected by a single line.

In remote monitoring, as shown in FIG. 3, a plurality of vehicles 20 are connected to a plurality of remote cockpits 30 via a server 10. The server 10 communicates with each of the plurality of vehicles 20. The server 10 receives monitoring information from each of the plurality of vehicles 20. At this time, by using a plurality of bundled lines between each of the plurality of vehicles 20 and the server 10, a wide bandwidth is secured. By broadcasting, the server 10 distributes the monitoring information received from the plurality of vehicles 20 to the plurality of remote cockpits 30. Note that the start procedure and the end procedure of the remote monitoring are the same as those in the system 101 according to the first embodiment.

Here, it is assumed that the driving of the vehicle 20-*i* among the plurality of vehicles 20 that are remotely monitored is switched from the automated driving with remote monitoring to the remote driving from the remote cockpit 30-*j*. Here, as shown in FIG. 4, the communication between the vehicle 20-*i* and the remote cockpit 30-*j* is switched to one-to-one communication through the server 10 while maintaining the server-client system. At this time, communication is performed between the vehicle 20-*i* and the servers using a plurality of bundled lines. Then, communication is performed between the servers and the remote cockpit 30-*j* using a single line. Note that the remote driving start procedure and the remote driving end procedure are the same as those in the system 101 according to the first embodiment.

The vehicle 20 other than the vehicle 20-*i*, for example, the vehicle 20-1 and the vehicle 20-2, is remotely monitored by N-to-N communication of the server-client system. The monitoring data received by the servers 10 from the vehicles 20-1 and 20-2 is broadcasted to the remote cockpit 30 other than the remote cockpit 30-*j*. The remote cockpit other than the remote cockpit 30-*j* is, for example, the remote cockpit 30-1 or the remote cockpit 30-2.

4. Procedure for Remote Monitoring

Figure 5:
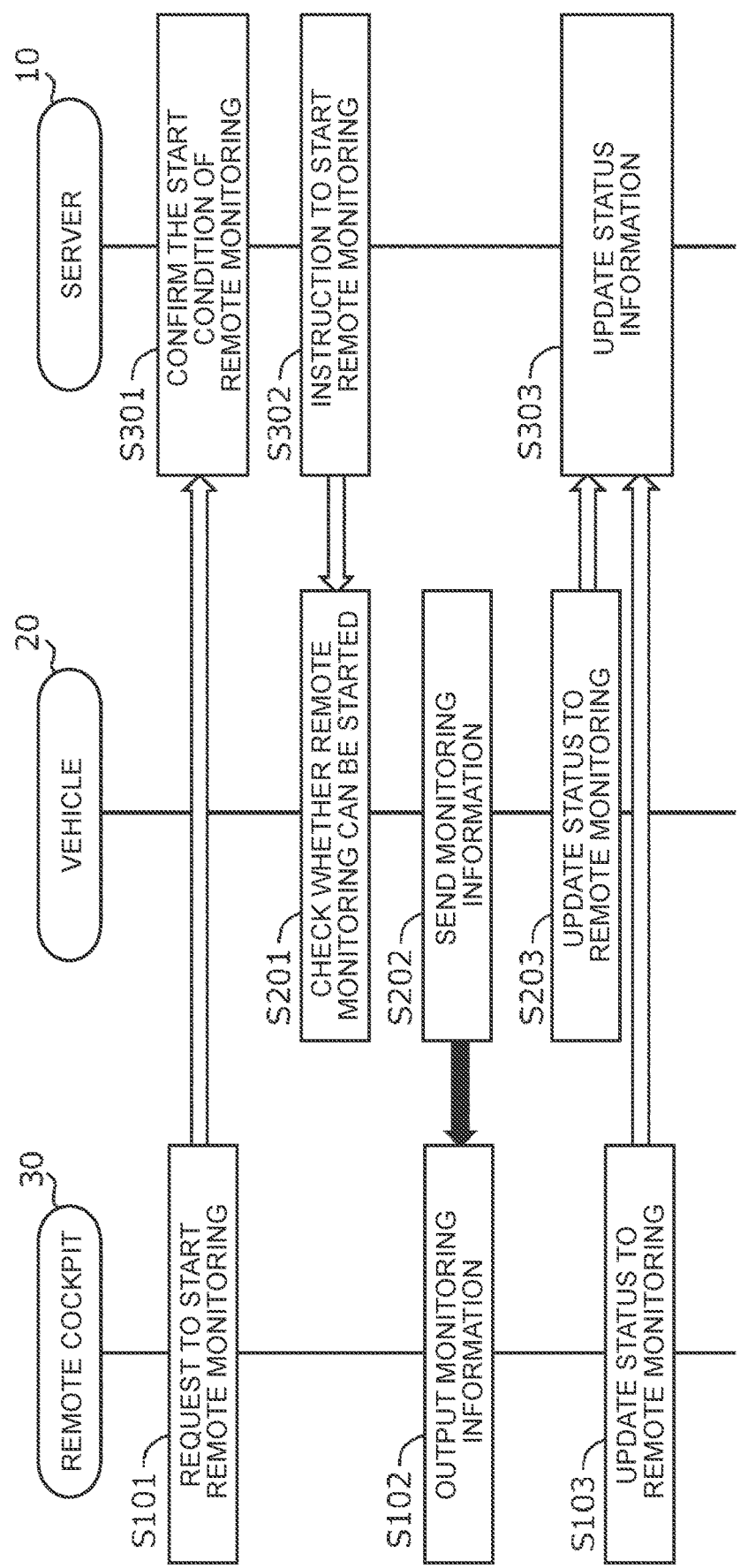
FIG. 5 is a sequence diagram illustrating a start procedure of remote monitoring common to the respective embodiments.

The procedure for performing remote monitoring is described with reference to FIG. 5 and FIG. 6. FIG. 5 is a sequence diagram illustrating a procedure for starting remote monitoring common to the above-described embodiments. FIG. 6 is a sequence diagram illustrating an end procedure of remote monitoring common to the above-described embodiments. The procedure shown in each sequence diagram applies to the combination of all vehicles 20 and remote cockpit 30 where remote monitoring is performed.

First, a procedure for starting remote monitoring shown in FIG. 5 will be described. The trigger for starting remote monitoring is a start operation of the remote driver 32 that operates the remote cockpit 30. Upon receiving the start of the remote driver 32, the remote cockpit 30 requests the server 10 to start remote monitoring (step S101).

Upon receiving the request to start, the server 10 confirms the start condition of the remote monitoring (step S301). Confirmation of the start condition by the server 10 is performed from the viewpoint of collective management of security. If the start condition is not satisfied, the server 10 notifies the remote cockpit 30 that the start of the remote monitoring is not possible. If the start condition is satisfied, the server 10 instructs the vehicle to be monitored to start remote monitoring (step S302).

Upon receiving the instruction to start, the vehicles 20 confirm whether or not to start remote monitoring (step S201). When the start is not possible, the vehicle 20 notifies the remote cockpit 30 that the start of the remote monitoring is not possible. On the other hand, when the remote monitoring can be started, the vehicles 20 connect to the remote cockpit 30 and start RT communication. RT communication is communication performed between the remote cockpit 30 and the vehicles 20 when the remote monitoring is performed and when the remote driving is performed. The communication indicated by the black arrow lines in the respective sequential diagrams is RT communication. RT communication at the time of executing remote monitoring is performed via the servers 10 in both the first embodiment and the second embodiment. The vehicles 20 transmit the monitoring data to the remote cockpit 30 by RT communication (step S202). Video, audio, instrument information, and vehicle state information are included in the monitoring information. The remote cockpit 30 outputs the received monitoring data to the monitor and the speaker (step S102).

After starting the remote monitoring, the remote cockpit 30 updates the status of its own stored in the memory to "remote monitoring" (step S103). Further, after the remote monitoring is started, the vehicle 20 updates the status of the vehicle stored in the memory to "remote monitoring" (step S203). Information regarding the updated state is transmitted to the server 10. The server 10 updates the information on the status of each of the remote cockpit 30 and the vehicle 20 stored in the memory (step S303).

Next, the procedure for ending the remote monitoring shown in FIG. 6 will be described. The trigger that the remote monitoring is terminated is a termination operation of the remote driver 32 that operates the remote cockpit 30. In response to the termination of the remote drivers 32, the remote cockpit 30 terminates RT communication (step S111). In response to this, RT communication is also terminated at the vehicle 20 (step S211). Termination of remote monitoring also includes abnormal termination. Therefore, unlike the start time of remote monitoring, confirmation by the server 10 is not performed at the end time.

After completion of the remote monitoring, the remote cockpit 30 updates its status stored in the memory to "wait" (step S112). In addition, after the remote monitoring is completed, the vehicle 20 updates the information about its own status stored in the memory to "standby" (step S212). Information regarding the updated state is transmitted to the server 10. The server 10 updates the information on the status of each of the remote cockpit 30 and the vehicle 20 stored in the memory (step S311).

5. Remote Operation Procedure

With reference to FIGS. 7 and 8, a procedure for performing remote driving will be described. FIG. 7 is a sequence diagram illustrating a start procedure of remote driving common to the above-described embodiments. FIG. 8 is a sequence diagram illustrating a procedure of ending remote driving common to the above-described embodiments. The procedure shown in each sequence diagram applies to the combination of all vehicles 20 and remote cockpit 30 in which remote driving is performed. Here, however, it is assumed that the remote driving is performed between the vehicle 20-*i* as the first mobile object and the remote cockpit 30-*j* as the first remote cockpit.

First, a procedure for starting remote driving shown in FIG. 7 will be described. The trigger that the remote driving is started is a start operation of the remote driver 32 that operates the remote cockpit 30-*j*. When the remote driver 32 starts, the remote cockpit 30-*j* requests the server 10 to start remote driving (step S121).

Upon receiving the request to start, the servers 10 confirm the start condition of the remote driving (step S321). Confirmation of the start condition by the server 10 is performed from the viewpoint of collective management of security. When the start condition is not satisfied, the server 10 notifies the remote cockpit 30-*j* that the start of the remote driving is not possible. If the start condition is satisfied, the server 10 instructs the vehicle 20-*i* to start remote driving (step S322). The instruction for starting the remote driving includes an address of the remote cockpit 30-*j* to which the vehicle 20-*i* is connected. Instead of the remote cockpit 30-*j*, the server 10 instructs the vehicle 20-*i* to initiate remote driving, which is a security measure to prevent the vehicle 20-*i* from taking over from the outside.

Upon receiving the instruction to start, the vehicle 20-*i* confirms whether or not to start the remote driving (step S221). Even if it is determined that the servers 10 are enabled, the vehicle 20-*i* may determine that remote driving cannot be started. If the start is not possible, the vehicle 20-*i* notifies the remote cockpit 30-*j* that the start of the remote driving is not possible. On the other hand, when the remote driving can be started, the vehicle 20-*i* and the remote cockpit 30-*j* are connected. Synchronization between the vehicle 20-*i* and the remote cockpit 30-*j* is then initiated by RT communication (step S122, step S222). In the first embodiment, RT communication at the time of executing the remote driving is performed directly between the vehicle 20-*i* and the remote cockpit 30-*j*. In the second embodiment, RT communication at the time of executing the remote driving is performed via the servers 10.

The vehicle 20-*i* and the remote cockpit 30-*j* confirm completion of synchronization (step S123, step S223). After the completion of the synchronization, the vehicle 20-*i* switches the driving mode of the vehicle from autonomous driving to remote driving (step S224). Then, the vehicle 20-*i* notifies the remote cockpit 30-*j* that the driving control right is valid (step S225). By the validity notification from the vehicle 20-*i*, the remote cockpit 30-*j* acquires the driving operation right for remotely operating the vehicle 20-*i* (step S124).

After acquiring the driving right, the remote cockpit 30-*j* updates the state-related information stored in the memory to "remote driving" (step S125). In addition, after the valid notification is transmitted, the vehicle 20-*i* updates its status stored in the memory to "remote driving" (step S226). Information regarding the updated state is transmitted to the server 10. The server 10 updates the status of each of the remote cockpit 30-*j* and the vehicle 20-*i* stored in the memory (step S323).

After the remote driving is started, the vehicle 20-*i* transmits the driving data to the remote cockpit 30-*j* (step S227). The remote cockpit 30-*j* outputs the received driving data to the monitor and the speaker (step S126). The driving information includes video, audio, instrument information, and vehicle state information. The remote cockpit 30-*j* transmits the control signal inputted by the remote operator 32 to the vehicle 20-*i* (step S127). The vehicle 20-*i* receives the control signal (step S228). The vehicle 20-*i* reflects the received control signal in the operation of the vehicle 20-*i* (step S229).

Next, the procedure of ending the remote driving shown in FIG. 8 will be described. The trigger that the remote driving is terminated is a termination operation of the remote driver 32 that operates the remote cockpit 30. In response to the termination of the remote driver 32, the remote cockpit 30-*j* requests the vehicle 20-*i* to terminate the remote driving (step S131). The vehicle 20-*i* receives a request to terminate the remote driving (step S231). Then, the remote driving is returned to the remote cockpit 30-*j* (step S232). Upon receiving the reply from the vehicle 20-*i*, the remote cockpit 30-*j* notifies the remote drivers 32 of the termination of the remote driving (step S132). Since the end of the remote driving also includes the forced end, unlike the start of the remote driving, the confirmation by the server 10 is not performed at the end.

The remote cockpit 30-*j* updates its status stored in the memory to "remote monitoring" after the remote driving is finished (step S133). In addition, after the remote driving is completed, the vehicle 20-*i* updates its status stored in the memories to "remote monitoring" (step S233). Information regarding the updated state is transmitted to the server 10. The server 10 updates the status of each of the remote cockpit 30-*j* and the vehicle 20-*i* stored in the memory (step S331). As described above, each time a predetermined event occurs, the servers 10 acquire information regarding the status of each of the plurality of vehicles 20 including the vehicle 20-*i* and the plurality of remote cockpits 30 including the remote cockpit 30-*j*.

After the remote driving is completed, the vehicle 20-*i* starts the autonomous driving (step S234). Then, the vehicle 20-*i* notifies the remote cockpit 30-*j* that the autonomous driving is started (step S235). Upon receiving the notification from the vehicle 20-*i*, the remote cockpit 30-*j* notifies the remote driver 32 that the autonomous driving is started (step S134).

6. Other

In each of the above-described embodiments, an autonomous vehicle is exemplified as a moving object to be subjected to remote monitoring and remote driving. However, the technology according to the present disclosure is also applicable to a moving body other than a vehicle such as a ship or a drone.

What is claimed is:
1. A system comprising:
   one or more processors; and
   a program memory storing a plurality of instructions that is combined with the one or more processors and that is executable, wherein the instructions are configured to cause the one or more processors to selectively execute a remote monitoring operation and remote driving operation, the remote monitoring operation including receiving monitoring information from each of a plurality of mobile objects including a first mobile object, and distributing the received monitoring information to a plurality of remote cockpits including a first remote cockpit, and the remote driving including establishing one-to-one communication between the first mobile object and the first remote cockpit for remote driving, wherein the monitoring information includes information corresponding to a state of each of the plurality of mobile objects.

2. The system according to claim 1, wherein:

at least a part of the one or more processors is provided in a server connected to the mobile objects via a mobile object communication network;

the monitoring information received from each of the mobile objects is distributed to the remote cockpits by the server in the remote monitoring operation; and peer-to-peer communication is performed between the first mobile object and the first remote cockpit without using the server in the remote driving operation.

3. The system according to claim 2, wherein the server is configured to acquire information about a status of each of the mobile objects including the first mobile object and a status of each of the remote cockpits including the first remote cockpit each time a predetermined event occurs.

4. The system according to claim 2, wherein:

at least a part of the one or more processors is provided in each of the plurality of remote cockpits including the first remote cockpit, and the remote monitoring operation further includes:
receiving, by the server from the first mobile object, a request for starting the remote monitoring operation,
evaluating, by the server, whether performance of the remote monitoring operation is possible based on the request for starting the remote monitoring operation and a communication between the server and the first mobile object,
based on the remote monitoring operation being possible, establishing real-time communication between the first mobile object and the first remote cockpit,
based on a termination of the remote monitoring operation by the first remote cockpit, terminating the real-time communication between the first mobile object and the first remote cockpit, and then
updating, by the server, a status of the first remote cockpit and the first mobile object.

5. The system according to claim 1, wherein:

at least a part of the one or more processors is provided in a server connected to the mobile objects via a mobile object communication network;

the mobile objects and the server are connected by a plurality of bundled lines;

the monitoring information received from each of the mobile objects is distributed to the remote cockpits by the server in the remote monitoring operation; and the one-to-one communication is performed between the first mobile object and the first remote cockpit via the server in the remote driving operation.

6. The system according to claim 5, wherein the server is configured to acquire information about a status of each of the mobile objects including the first mobile object and a status of each of the remote cockpits including the first remote cockpit each time a predetermined event occurs.

7. The system according to claim 1, wherein:

at least a part of the one or more processors is provided in a server, provided in each of the plurality of remote cockpits including the first remote cockpit, and connected to the mobile objects via a mobile object communication network; and the remote driving operation further includes:
receiving, by the server from the first remote cockpit, a request to start the remote driving operation,
evaluating, by the server, a condition for starting the remote driving operation,
based on the condition being satisfied, instructing, by the server, the first remote cockpit to start the remote driving operation,
establishing the one-to-one communication, in real time, between the first mobile object and the first remote cockpit for remote driving, and then
based on a termination of the remote driving by the first remote cockpit, updating, by the server, a status of the first remote cockpit and the first mobile object.

8. The system according to claim 1, wherein:

at least a part of the one or more processors is provided in a server, provided in each of the plurality of remote cockpits including the first remote cockpit, and connected to the mobile objects via a mobile object communication network;

the remote driving operation further includes:
receiving, by the server from the first remote cockpit, a request to start the remote driving operation,
evaluating, by the server, a condition for starting the remote driving operation,
based on the condition being satisfied, instructing, by the server, the first remote cockpit to start the remote driving operation,
establishing the one-to-one communication, in real time, between the first mobile object and the first remote cockpit for remote driving, and then
based on a termination of the remote driving by the first remote cockpit, updating, by the server, a status of the first remote cockpit and the first mobile object; and the remote monitoring operation further includes:
receiving, by the server from the first mobile object, a request for starting the remote monitoring operation,
evaluating, by the server, whether performance of the remote monitoring operation is possible based on the request for starting the remote monitoring operation and a communication between the server and the first mobile object,
based on the remote monitoring operation being possible, establishing real-time communication between the first mobile object and the first remote cockpit,
based on a termination of the remote monitoring operation by the first remote cockpit, terminating the real-time communication between the first mobile object and the first remote cockpit, and then
updating, by the server, a status of the first remote cockpit and the first mobile object.

9. A method comprising:

selectively providing remote monitoring and remote driving to a plurality of mobile objects including a first mobile object;

distributing monitoring information received from each of the mobile objects to a plurality of remote cockpits including a first remote cockpit in the remote monitoring; and establishing one-to-one communication between the first mobile object and the first remote cockpit in the remote driving, wherein the monitoring information includes information corresponding to a state of each of the plurality of mobile objects.

10. A non-transitory storage medium storing a program configured to cause a computer to execute processes comprising:

selectively providing remote monitoring and remote driving to a plurality of mobile objects including a first mobile object;

distributing monitoring information received from each of the mobile objects to a plurality of remote cockpits including a first remote cockpit in the remote monitoring; and establishing one-to-one communication between the first mobile object and the first remote cockpit in the remote driving, wherein the monitoring information includes information corresponding to a state of each of the plurality of mobile objects.

* * * * *